(12) United States Patent
Qin (10) Patent No.: US 10,136,096 B2
(45) Date of Patent: Nov. 20, 2018

(54) METHOD FOR PLAYING DEMO VIDEO ON TELEVISION, TELEVISION AND STORAGE MEDIUM

(71) Applicants: Hisense Electric Co., Ltd., Shandong (CN); Hisense USA Corporation, Suwanee, GA (US)

(72) Inventor: Yingsheng Qin, Shandong (CN)

(73) Assignees: Hisense Electric Co., Ltd., Qingdao (CN); Hisense USA Corporation, Suwanee, GA (US)

( * ) Notice: Subject to any disclaimer, the term of this patent is extended or adjusted under 35 U.S.C. 154(b) by 99 days.

(21) Appl. No.: 14/467,080

(22) Filed: Aug. 25, 2014

(65) Prior Publication Data

US 2015/0271436 A1 Sep. 24, 2015

(30) Foreign Application Priority Data

Mar. 20, 2014 (CN) .......................... 2014 1 0105408

(51) Int. Cl.
*H04N 5/775* (2006.01)
*H04N 5/76* (2006.01)
*G11B 27/00* (2006.01)

(52) U.S. Cl.
CPC ............... *H04N 5/76* (2013.01); *G11B 27/00* (2013.01)

(58) Field of Classification Search
USPC .......................................... 386/231, 239–248
See application file for complete search history.

(56) References Cited

U.S. PATENT DOCUMENTS

| 7,305,503 | B2* | 12/2007 | Lefevre | G06F 1/3203 |
| | | | | 348/E5.006 |
| 2001/0006771 | A1* | 7/2001 | Kajiyama | G10H 1/363 |
| | | | | 434/307 A |
| 2003/0016941 | A1* | 1/2003 | Unemura | H04N 21/4436 |
| | | | | 386/357 |
| 2004/0156613 | A1* | 8/2004 | Hempel | H04N 5/913 |
| | | | | 386/328 |
| 2005/0062888 | A1* | 3/2005 | Wood | H04N 5/775 |
| | | | | 348/553 |
| 2011/0261157 | A1* | 10/2011 | Kiyama | H04N 13/0044 |
| | | | | 348/43 |
| 2012/0257120 | A1* | 10/2012 | Nakai | H04N 5/50 |
| | | | | 348/731 |

* cited by examiner

*Primary Examiner* — Hung Q Dang
(74) *Attorney, Agent, or Firm* — Brinks Gilson & Lione (57) ABSTRACT

The disclosure discloses a method for playing a demo video on a television and a television so as to play the demo video on the television automatically. The method includes: detecting whether there is an external storage device connected with the television; searching an external storage device connected with the television for a demo video file with a preset file name and in a preset file format upon detection of the external storage device; and starting a player to read and play cyclically the demo video file stored in the external storage device when the demo video file is searched.

15 Claims, 3 Drawing Sheets

METHOD FOR PLAYING DEMO VIDEO ON TELEVISION, TELEVISION AND STORAGE MEDIUM

CROSS REFERENCE OF RELATED APPLICATION

This application claims priority to Chinese Patent Application No. 201410105408.5, entitled "METHOD FOR PLAYING DEMO VIDEO ON TELEVISION, AND TELEVISION", filed with the State Intellectual Property Office of People's Republic of China on Mar. 20, 2014, the content of which is incorporated herein by reference in its entirety.

TECHNICAL FIELD

The present disclosure relates to the field of television technologies and particularly to a method for playing a demo video on a television, a television and a storage medium.

BACKGROUND

It is currently common to play a uniform video signal of a shopping center on televisions for demostration in the shopping center, and it is impossible to perfectly present a display effect of a television by such a video as it may be done by a demo video customized by a manufacturer for its own product, so that a consumer picking out a television product for purchase may not be presented with its display advantage. If a demo video provided by a manufacturer is played for a television of the manufacturer, then there will be a benefit of specifically exhibiting a display advantage of the television of the manufacturer.

SUMMARY

An example embodiment of the present disclosure provides a method for playing a demo video on a television, which includes:

detecting whether there is an external storage device connected with the television;

searching an external storage device connected with the television for a demo video file with a preset file name upon detection of the external storage device; and starting a player to read and play the demo video file stored in the external storage device when the demo video file is searched.

An example embodiment of the present disclosure provides a television, which includes:

a memory; and one or more processors, wherein:

the memory is configured to store processor-readable program code, and the one or more processors perform the processor-readable program code to implement:

detecting whether there is an external storage device connected with the television;

searching an external storage device connected with the television for a demo video file with a preset file name upon detection of the external storage device; and starting a player to read and play the demo video file stored in the external storage device when the demo video file is searched.

An example embodiment of the present disclosure provides a processor-readable storage medium which stores processor-readable program code, wherein the processor-readable program code is executable to implement:

detecting whether there is an external storage device connected with a television;

searching an external storage device connected with the television for a demo video file with a preset file name upon detection of the external storage device; and starting a player to read and play the demo video file stored in the external storage device when the demo video file is searched.

DETAILED DESCRIPTION OF THE EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Embodiments of the present disclosure will be described below in details with reference to the drawings.

Figure 1:
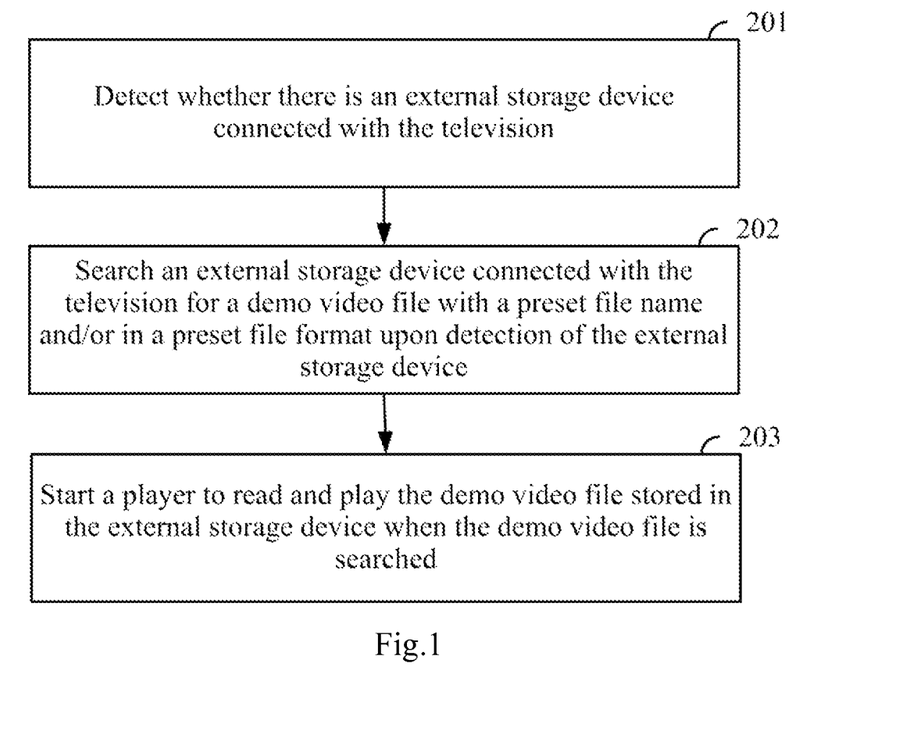
FIG. 1 is a flow chart of a method for playing a demo video on a television according to an example embodiment of the present disclosure.

As illustrated in FIG. 1, a flow of a method for playing a demo video on a television according to an example embodiment of the present disclosure is as follows.

Block 201: Detect whether there is an external storage device connected with the television. In one or more example embodiments of the present disclosure, the external storage device may be a storage device plugged into a television Universal Serial Bus (USB) interface or a network storage device connected over a network. To detect whether there is a connected external storage device may be to detect whether there is a storage device plugged into the USB interface, or whether data transmission communication is set up between the television and a network storage space, etc. However, the present disclosure will not be limited to the USB interface and the network storage device thereof described above but may be other interfaces and other network storage devices, e.g., a High Definition Multimedia Interface (HDMI), etc.

Block 202: Search an external storage device connected with the television for a demo video file with a preset file name and/or in a preset file format upon detection of the external storage device. In one or more embodiments of the present disclosure, a demo video file only with the preset file name may be searched for, or a demo video file only in the preset file format may be searched for, or a demo video file both with the preset file name and in the preset file format may be searched for.

Block 203: Start a player to read and play the demo video file stored in the external storage device when the demo video file is searched. In an example embodiment of the present disclosure, the demo video file may be played cyclically.

In an example embodiment of the present disclosure, the detection of the external storage device and the search for the demo video file and the playing of the demo video file may be automated after the television is powered on or during normal operation of the television to thereby play the presented video automatically without any manual operation.

Optionally, the television operates in a demo video play mode after the television is powered on and before the existence of an external storage device connected with the television is detected automatically. In an example embodiment, the television may be configured in the demo video play mode or a normal play mode, and when a switch operation is detected and the switched-to play mode is the demo video play mode, the television is switched to the demo video play mode. The switch operation may be performed through a switch on the television or through a remote controller.

Alternatively, the television enters the demo video play mode upon detection of an inserted U-disk or enters the demo video play mode by default after being powered on. In an example embodiment of the present disclosure, the demo video play mode refers to an operating mode in which the demo video, with the preset file name and/or in the preset file format, stored in the external storage device is played by the television. Through the configuration of the demo video play mode, the number of times that the television enters the demo video play mode during home use process may be decreased and an influence on a normal access to other functions of the television may be alleviated.

In one or more embodiments of the present disclosure, a first timer is started and the existence of a key press operation is detected after the television is powered on or after the television enters the demo video play mode or upon detection of no external storage device connected with the television; and if there is a key press operation detected before a preset time of the first timer is reached, then the key press operation is applied and the first timer is restarted; or if there is not any key press operation (which may be a key press operation on the television or a key press operation on the remote controller) detected when the preset time of the first timer is reached, then the existence of an external storage device connected with the television is detected again.

In one or more embodiments of the present disclosure, after an external storage device connected with the television is detected, when it is confirmed that there is no demo video file stored in the external storage device, a first timer is started and the existence of a key press operation is detected; and if there is a key press operation detected before a preset time of the first timer is reached, then the key press operation is applied and the first timer is restarted; or if there is not any key press operation detected when the preset time of the first timer is reached, then the existence of an external storage device connected with the television is detected.

In an embodiment of the present disclosure, when there is no external storage device or demo video file, the first timer is set to detect whether there is an external storage device connected with the television for a preset time, and if there is a press key operation in the detection process the press key operation may be performed to thereby enable a user to experience other functions of the television. Moreover the first timer is restarted when there is a press key operation to thereby alleviate confliction between the process of detecting an external storage device and searching for and playing a demo video file and the process of performing a key press operation by the user so as to improve an experience of the user.

In one or more embodiments of the present disclosure, a second timer is started and the existence of a key press operation is detected when a demo video file is detected and the player is started to read and play the demo video file; and if there is a key press operation detected before a preset time of the second timer is reached, then the player is stopped, the key press operation is performed and the second timer is restarted; or if there is not any key press operation detected when the preset time of the second timer is reached, then the existence of an external storage device connected with the television is detected.

In an embodiment of the disclosure, when the demo video is played, the second timer is set to make the television resume automatically to the step of detecting whether there is a connected external storage device connected with the television, instead of maintaining the function corresponding to the press key lastly operated by the user, when a key press operated by the user to experience other functions of the television and no longer operated to reach a preset time is detected. Furthermore, the second timer is restarted when there is a key press operation to thereby alleviate confliction between the process of playing the demo video and the process of performing the key press operation by the user so as to improve an experience of the user.

The preset times of the first timer and the second timer may be the same or different. If the preset times of the first timer and the second timer are the same, then the first timer and the second timer can be embodied as a single timer.

Particularly, the external storage device may be a storage device capable of connecting with the television, e.g., a U-disk, a removable hard disk, etc. The external storage device may be connected with the television via a Universal Serial Bus (USB) interface.

In one or more embodiments of the present disclosure, the process of starting the player and playing the demo video file cyclically is as follows: a storage path of the demo video file is achieved and stored into the player, the player is started, and the demo video file is read along the storage path and played.

In one or more embodiments of the present disclosure, if a plurality of external storage devices connected with the television are detected, then each of the external storage devices is searched for a demo video file, and if there are two or more demo video files, then a storage path of each of the found demo video files is achieved and stored, the player is started, and the corresponding demo video files are achieved sequentially along the respective storage paths and played. Stated otherwise, the player is started and set to play the demo video files corresponding to the respective storage paths.

In an example embodiment of the present disclosure, the demo video file has a preset file name and/or a particular video file format, and respective files stored in an external storage device connected with the television are searched for a file with a particular file name and a particular extension after the external storage device is detected. For example, the demo video file is "Demo video.avi".

For example, the television is connected with a U-disk 1 and a U-disk 2 respectively via USB interfaces, wherein the U-disk 1 is searched for a demo video file "Demo video1.avi", and the U-disk 2 is searched for a demo video file "Demo video2.avi", and storage paths of the files "Demo video1.avi" and "Demo video2.avi" are stored, the player is started, and "Demo video1.avi" and "Demo video2.avi" are achieved sequentially along the storage paths and played.

In one or more embodiments of the present disclosure, a third timer is set in a thread so that the third timer is configured with the time required for playing the demo video file, and the player is controlled by the thread to be started and to read and play the demo video file to thereby play the demo video file cyclically. For example, the third timer is set in the thread to be configured with 10 minutes, and then the player is controlled by the thread to be started and to read and play the demo video file for 10-minute.

For example, when there are two demo video files, "Demo video1.avi" and "Demo video2.avi", the preset time may be set to the time required for playing "Demo video1.avi" and "Demo video2.avi" without any break.

Figure 2:
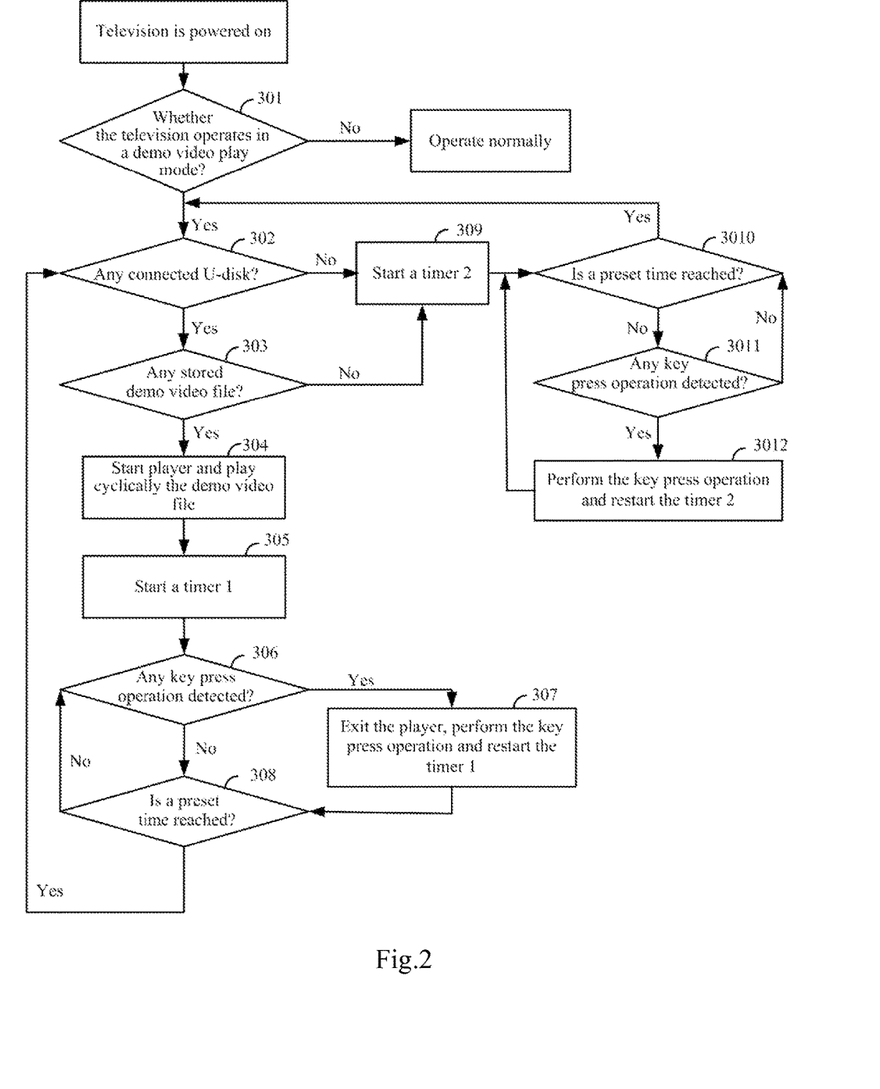
FIG. 2 is a flow chart of a method for playing a demo video on a television according to another example embodiment of the present disclosure.

The method for playing a demo video on a television will be described below in an embodiment thereof with reference to FIG. 2.

Block 301: Judge whether the television operates in a demo video play mode after being powered on, and if so, proceed to block 302; otherwise, the television operates normally.

Block 302: Detect automatically whether there is a connected U-disk, and if so, proceed to block 303; otherwise, proceed to block 309.

Block 303: Search the U-disk for a demo video file, and if there is a demo video file in the U-disk, proceed to block 304; otherwise, proceed to block 309.

Block 304: Start automatically a player to play the demo video file cyclically.

Block 305: Start a timer 1, wherein the timer 1 is assumed to be configured with a 10-minutes preset time.

Block 306: Detect if there is a key press operation, and if so, proceed to block 307; otherwise, proceed to block 308.

Block 307: Exit the player, and perform the key press operation and restart the timer 1.

Block 308: Judge whether the preset time of the timer 1 is reached, and if so, proceed to the block 302; otherwise, proceed to the block 306;

Block 309: Start a timer 2, wherein the timer 2 is assumed to be configured with a 10-minutes preset time.

Block 3010: Judge whether the preset time of the timer 2 is reached, and if so, to proceed to the block 302; otherwise, to proceed to block 3011.

Block 3011: Detect whether there is a key press operation, and if so, proceed to block 3012; otherwise, proceed to the block 3010.

Block 3012: Perform the key press operation, restart the timer 2 and return to proceed to the block 3010.

Figure 3:
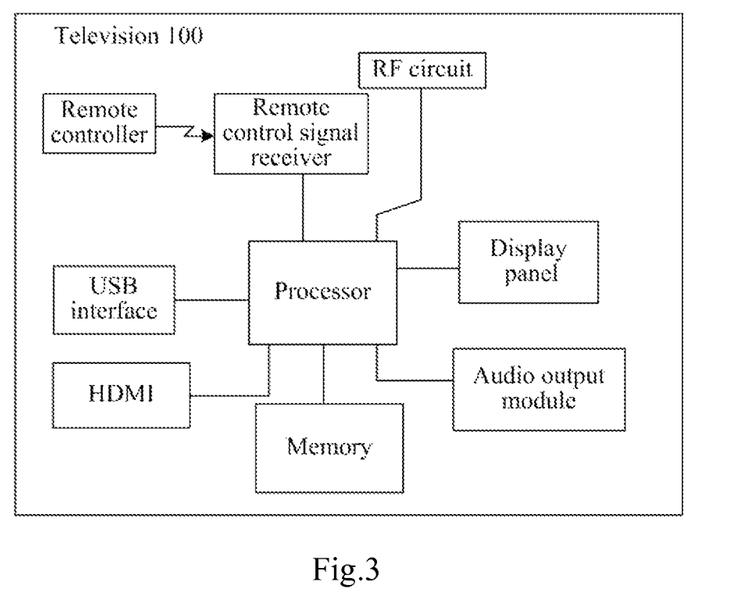
FIG. 3 is a schematic structural diagram of a television according to an example embodiment of the present disclosure.

An example embodiment of the present disclosure further provides a television, and as illustrated in FIG. 3, the television generally includes the following components.

The television 100 may include a memory, an input component, an output component, one or more processors and other components. Those skilled in the art may appreciate that the structure of the television illustrated in FIG. 3 will not be intended to limit the television, and more or less components than those as illustrated may be included or some of the components may be combined or different arrangement of components may be arranged.

The memory is configured to store instruction code, and the processor is configured to execute the instruction code in the memory to thereby perform various function applications and data processing. The memory may include a high-speed random access memory and may further include a nonvolatile memory, e.g., at least one magnetic-disk memory device, a flash memory device or other volatile solid memory device. Moreover, the memory may further include a memory controller configured to provide an access of the processor and the input component to the memory.

The processor, which is a control section of the television 100, connects with the respective components of the entire television through various interfaces and lines, runs or executes the instruction code stored in the memory and calls the data stored in the memory to perform the various functions of the television 100 and process the data to thereby control the whole television. Optionally, the processor may include one or more processing cores or one or more processor; and optionally, the processor may be integrated with an application processor and a modem processor, wherein the application processor generally disposes an operating system, user interfaces, applications, etc., and the modem processor generally disposes wireless communication. As can be appreciated, the modem processor described above may not be integrated into the processor.

The television 100 may include a television broadcast receiver, a High Definition Multimedia Interface (HDMI), a USB interface or other input components, and the input component may further include a remote control receiver configured to receive a signal transmitted from the remote controller. Moreover, the input component may further include a touch sensitive surface and other input devices, wherein the touch sensitive surface may be embodied in resistive, capacitive, infrared, surface sound wave and other types, and other input devices may include but will not be limited to one or more of a physical keyboard, functional keys (e.g., volume control press keys, a switch press key, etc.), a track ball, a mouse, a joystick, etc.

The output component is configured to output an audio signal, a video signal, an alarm signal, etc. The output component may include a display panel, an audio output module, etc. The display panel may be configured to display information input by a user or information provided to the user and various graphic user interfaces of the television 100, wherein these graphic user interfaces may be composed of graphics, texts, icons, videos and any combination thereof. The display panel may be embodied as a Liquid Crystal Display (LCD), an Organic Light-Emitting Diode (OLED) display, a flexible display, a 3D display, a CRT, a plasma display panel, etc.

The television 100 may further include at least one sensor (not illustrated in the figures), e.g., an optical sensor, a motion sensor and other sensors. Particularly, the optical sensor may include an ambient optical sensor and a proximity sensor, wherein the ambient optical sensor may adjust the brightness of the display panel according to the luminosity of ambient light, and the proximity sensor may power off the display panel and/or a backlight when the television 100 moves to a defined location. The television 100 may be further configured with a gyroscope, a barometer, a hygrometer, a thermometer, an infrared sensor and other sensors.

The television 100 may further include an audio circuit (not illustrated in the figures), and an audio interface between the user and the television 100 may be provided by a speaker and a microphone. The audio circuit may convert received audio data into an electric signal and transmit the electric signal to the speaker, and the electric signal is converted by the speaker into an audio signal for output; and on the other hand, the microphone converts a collected audio signal into an electric signal which is received and then converted into audio data by the audio circuit, and the audio data is further output to the processor for processing and then transmitted to another television terminal, for example, or the audio data is output to the memory for further processing. The audio circuit may further include an earphone jack for communication between a peripheral earphone and the television 100.

Moreover the television 100 may further include a Radio Frequency (RF) circuit. The RF circuit may be configured to receive and transmit a signal. Typically, the RF circuit includes but will not be limited to an antenna, at least one amplifier, a tuner, one or more oscillators, a Subscriber Identity Module (SIM) card, a transceiver, a coupler, a Low Noise Amplifier (LNA), a duplexer, etc. Moreover, the television 100 may further include a camera, a Bluetooth module, etc.

Moreover, the television 100 may further include a WiFi (Wireless Fidelity) module (not illustrated in the figures). The WiFi falls into the category of short-range wireless transmission technologies, and through the WiFi module the television 100 may assist the user in receiving and transmitting an e-mail, browsing a webpage, accessing streaming media, etc., wherein the user is provided with a broadband wireless access to the Internet by the WiFi module. Although the WiFi module is mentioned here, it may be appreciated that it may not be necessarily required for the television 100 but may be omitted as desired without departing from the scope of the present disclosure.

The processor executes the processor-readable instruction code in the memory to implement:

detecting whether there is an external storage device connected with the television;

searching an external storage device connected with the television for a demo video file with a preset file name and/or in a preset file format upon detection of the external storage device; and starting a player to read and play the demo video file stored in the external storage device when the demo video file is searched.

Optionally, detecting whether there is an external storage device connected with the television further includes:

starting a first timer and detecting whether there is a key press operation upon detection of no external storage device connected with the television; and if there is a key press operation detected before a preset time of the first timer is reached, performing the key press operation and restarting the first timer; or if there is not any key press operation detected when the preset time of the first timer is reached, detecting whether there is an external storage device connected with the television.

Optionally, searching an external storage device connected with the television for a demo video file with a preset file name and/or in a preset file format includes:

starting a first timer and detecting whether there is a key press operation when it is confirmed that there is no demo video file stored in the external storage device; and if there is a key press operation detected before a preset time of the first timer is reached, performing the key press operation and restarting the first timer; or if there is not any key press operation detected when the preset time of the first timer is reached, detecting whether there is an external storage device connected with the television.

Optionally, the processor further executes the processor-readable program code to implement:

starting a second timer and detecting whether there is a key press operation when the player is started to read and play the demo video file; and if there is a key press operation detected before a preset time of the second timer is reached, stopping playing the player, and performing the key press operation and restarting the second timer; or if there is not any key press operation detected when the preset time of the second timer is reached, detecting whether there is an external storage device connected with the television.

Optionally, the processor further executes the processor-readable program code to implement:

making the television operate in a demo video play mode before detecting whether there is an external storage device connected with the television.

An embodiment of the present disclosure further provides one or more non-transitory processor-readable storage medium which stores processor-readable program code (For example, the non-transitory processor-readable storage medium may be a RAM memory, flash memory, ROM memory, EPROM memory, EEPROM memory, registers, hard disk, a removable disk, a CD-ROM, or any other form of non-transitory storage medium known in the art.), wherein the processor-readable program code is executable to implement:

detecting whether there is an external storage device connected with a television;

searching an external storage device connected with the television for a demo video file with a preset file name upon detection of the external storage device; and starting a player to read and play the demo video file stored in the external storage device when the demo video file is searched.

Optionally, executing the processor-readable program code to implement detecting whether there is an external storage device connected with a television further includes:

starting a first timer and detecting whether there is a key press operation; and if there is a key press operation detected before a preset time of the first timer is reached, performing the key press operation and restarting the first timer; or if there is not any key press operation detected when the preset time of the first timer is reached, detecting whether there is an external storage device connected with the television.

Optionally, executing the processor-readable program code to implement searching an external storage device connected with the television for a demo video file with a preset file name further includes:

starting a first timer and detecting whether there is a key press operation when it is confirmed that there is no demo video file stored in the external storage device; and if there is a key press operation detected before a preset time of the first timer is reached, performing the key press operation and restarting the first timer; or if there is not any key press operation detected when the preset time of the first timer is reached, detecting whether there is an external storage device connected with the television.

Optionally, the processor-readable program codes may be further executed to implement:

starting a second timer and detecting whether there is a key press operation when the player is started to read and play the demo video file; and if there is a key press operation detected before a preset time of the second timer is reached, stopping playing the player, and performing the key press operation and restarting the second timer; or if there is not any key press operation detected when the preset time of the second timer is reached, detecting whether there is an external storage device connected with the television.

Optionally, the processor-readable program codes may be further executed to implement:

making the television operate in a demo video play mode before detecting whether there is an external storage device connected with the television.

With the foregoing technical solution, in the embodiments of the present disclosure, when an external storage device connected with the television and a demo video file stored in the external storage device are detected automatically, the player is started automatically and the demo video file is read and played cyclically, thus realizing playing the demo video on the television automatically and improving the efficiency of playing the demo video.

Those skilled in the art shall appreciate that the embodiments of the present disclosure may be embodied as a method, a system or a computer program product. Therefore the disclosure can be embodied in the form of an all-hardware embodiment, an all-software embodiment or an embodiment of software and hardware in combination. Furthermore, the disclosure may be embodied in the form of a computer program product embodied in one or more computer useable storage mediums (including but not limited to a disk memory, a CD-ROM, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or processors of other programmable data processing devices to produce a machine so that the instructions executed on the computer or the processors of other programmable data processing devices create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the present disclosure have been described, those skilled in the art benefiting from the underlying inventive concept may make additional modifications and variations to these embodiments. Therefore, the appended claims are intended to be construed as encompassing the preferred embodiments and all the modifications and variations coming into the scope of the present disclosure.

Evidently, those skilled in the art may make various modifications and variations to the disclosure without departing from the spirit and scope of the disclosure. Thus, the disclosure is also intended to encompass these modifications and variations thereto so long as the modifications and variations come into the scope of the claims appended to the disclosure and their equivalents.

The invention claimed is:

1. A method of playing a video on a television comprising:
   detecting whether there is an external storage device connected to the television;
   on a condition that no external device is detected, triggering a first timer associated with a first preset time period to start and detecting whether there is a key press operation after the first timer is triggered and before the first preset time period of the first timer lapses;
   if the key press operation is detected before the first preset time period of the first timer lapses, performing the key press operation and resetting the first timer to the first preset time period and restarting the first timer;
   if no key press operation is detected by a moment when the first timer lapses, re-detecting whether there is an external storage device connected to the television when the first preset time period of the first timer lapses;
   if the external storage device is detected, searching for the video with a preset file name in the external storage device; and
   playing the video on the television when the video with the preset file name is found.

2. The method according to claim 1, further comprising:
   triggering a second timer associated with a second preset time period to start and detecting whether there is a key press operation when the external storage device is detected but the video with the preset file name is not found; and if the key press operation is detected before the second preset time period of the second timer lapses, performing the key press operation and resetting the second timer to the second preset time period and restarting the second timer.

3. The method according to claim 2, further comprising:
if no key press operation is detected by a moment the second preset time period of the second timer lapses, detecting whether there is an external storage device connected with the television.

4. The method according to claim 1, further comprising:
triggering a third timer associated with a third preset time period to start when the video is found and played and detecting whether there is a key press operation before the third preset time period of the third timer lapses when the video is being played; and if the key press operation is detected before the third preset time period of the third timer lapses; stopping playing the video, performing the key press operation, and resetting the third timer to the third preset time period and restarting the third timer.

5. The method according to claim 4, further comprising:
if no key press operation is detected by a moment when the third preset time period of the third timer lapses, detecting whether there is an external storage device connected to the television.

6. The method according to claim 1, further comprising:
enabling the television to operate in a video play mode before detecting whether there is an external storage device connected to the television.

7. A television comprising:
a video player;
a processor; and
a memory storing at least one instruction, wherein the processor is configured to execute the at least one instruction to:
detect whether there is an external storage device connected to the television;
on a condition that no external storage device is detected, trigger a first timer associated with a first preset time period to start and detect whether there is a key press operation after the first timer is triggered and before the first preset time period of the first timer lapses;
if the key press operation is detected before the first preset time period of the first timer lapses, perform the key press operation and reset the first timer to the first preset time period and restart the first timer;
if no key press operation is detected by a moment when the first preset time period of the first timer lapses, re-detect whether there is an external storage device connected to the television when the first preset time period of the first timer lapses;
if the external storage device is detected, search for a video with a preset file name in the external storage device and control the video player to play the video with the preset file name on the television when the video is found.

8. The television according to claim 7, wherein the processor is further configured to execute the at least one instruction to:
trigger a second timer associated with a second preset time period to start and detect whether there is a key press operation when the external storage device is detected but the video with the preset file name is not found; and if the key press operation is detected before the second preset time period of the second timer lapses, perform the key press operation and reset the second timer to the second preset time period and restart the second timer.

9. The television according to claim 8, wherein the processor is further configured to execute the at least one instruction to:
if no key press operation is detected by a moment the second preset time period of the second timer lapses, detect whether there is an external storage device connected to the television.

10. The television according to claim 7, wherein the processor is further configured to execute the at least one instruction to:
trigger a third timer associated with a third preset time period to start when the video is found and played and detect whether there is a key press operation before the third timer lapses when the video is being played; and if the key press operation is detected before the third preset time period of the third timer lapses, control the video player to stop playing the video, perform the key press operation and reset the third timer to the third preset time period and restart the third timer.

11. The television according to claim 10, wherein the processor is further configured to execute the at least one instruction to:
if no key press operation is detected by a moment when the third preset time period of the third timer lapses, detect whether there is an external storage device connected to the television.

12. The television according to claim 7, wherein the television operates in a video play mode before the processor detects whether there is an external storage device connected to the television.

13. A non-transitory storage medium, storing therein computer readable program codes configured to be executed by a processor to perform operations of:
detecting whether there is an external storage device connected with a television;
on a condition that no external storage device is detected, triggering a first timer associated with a first preset time period to start and detecting whether there is a key press operation after the first timer is triggered and before the first preset time period of the first timer lapses;
if the key press operation is detected before the first preset time period of the first timer lapses, performing the key press operation and resetting the first timer to the first preset time period and restarting the first timer;
if no key press operation is detected by a moment when the first timer lapses, re-detecting whether there is an external storage device connected to the television when the first preset time period of the first timer lapses;
if the external storage device is detected, searching for a video with a preset file name in the external storage device; and
playing the video on the television when the video with the preset file name is found.

14. The storage medium according to claim 13, wherein the computer readable program codes are further configured to be executed by the processor to perform operations of:
triggering a second timer associated with a second preset time period to start when the video is found and played and detecting whether there is a key press operation before the second preset time period of the second timer lapses when the video is being played player in the television is started to read and play the video; and
if the key press operation is detected before the second preset time period of the second timer lapses, stopping playing the video, performing the key press operation and resetting the second timer to the second preset time period and restarting the second timer.

15. The storage medium according to claim 13, wherein the computer readable program codes are further configured to be executed by the processor to perform an operation of:
enabling the television to operate in a video play mode before detecting whether there is an external storage device connected to the television.

* * * * *